June 17, 1969
M. A. JARVIS
3,450,267
POROUS MEMBRANE SUPPORT
Filed Aug. 28, 1967
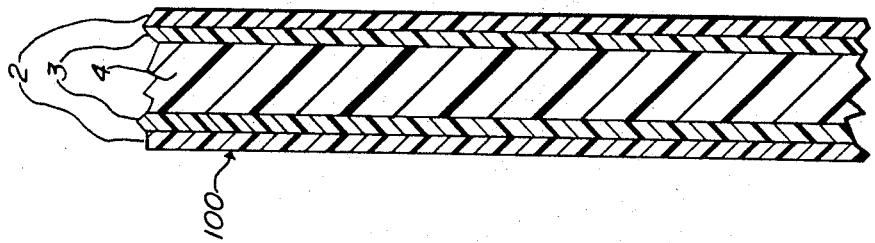
FIG. 1
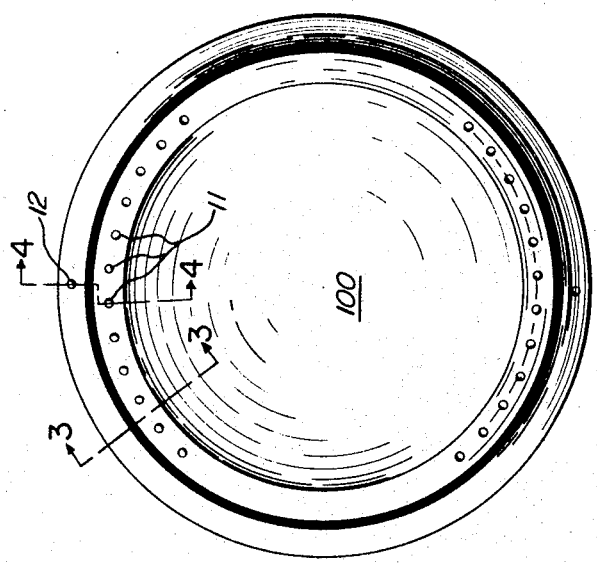
FIG. 2
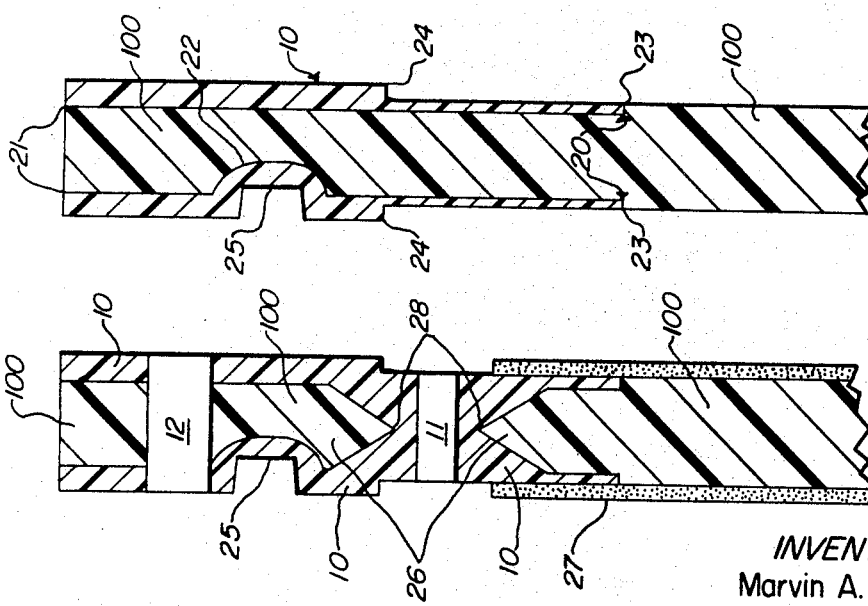
FIG. 3
FIG. 4
INVENTOR
Marvin A. Jarvis
BY Ernest J. Cohen
Robert N. Davidson United States Patent Office 3,450,267
Patented June 17, 1969

3,450,267
POROUS MEMBRANE SUPPORT
Marvin A. Jarvis, Walnut, Calif., assignor, by mesne assignments, to the United States of America as represented by the Secretary of the Interior
Filed Aug. 28, 1967, Ser. No. 664,243
Int. Cl. C02b 11/82; B01d 13/00
U.S. Cl. 210—321                                 1 Claim

ABSTRACT OF THE DISCLOSURE

A laminated porous membrane support in which the faces of the support have pores of smaller diameter than the interior portion.

BACKGROUND

Field of invention

This invention relates to porous backup plates which are used primarily as supports for membrane or filter materials in high pressure osmotic or filter applications. To serve as a backup plate, a material must be porous to allow passage of liquids or gases; it must possess great mechanical strength to withstand high pressure loadings, and it must be free from gross surface irregularities which could rupture or otherwise damage a membrane or filter.

Description of the prior art

Previously, porous backup plates were fabricated from expensive metals such as stainless steel or bronze. A typical prior art example is shown in U.S. Patent 3,133,132 to Loeb et al. There, the patentees describe a stainless disc which is used as a porous backup plate for a reverse osmosis membrane. The problems which have been encountered when using metal plates of that nature include lack of control over porosity and corrosion. The former poses a particularly difficult problem because, if the pores of the support are too large, the high pressure inherent in the reverse osmosis process will cause the membrane to deform into these large holes and burst. On the other hand, if the pores are too small, the plate will cause a high resistance to flow and consequently an undesirable backup pressure.

I have solved these problems through the use of the present porous backup plate which is constructed from a corrosive-resistant material such as plastic or glass fiber and is fabricated in a manner which allows for porosity control.

SUMMARY

Briefly, the present invention comprises an improved backup plate for membranes or filters. The plate is fashioned of a noncorrosive material in a manner such that the porosity at the faces of the plate is less than in the center. Such a configuration prevents possible damage to the membrane due to deformation, yet significantly reduces the pressure drop found in conventional supports. Further, the present support may be made from cheap noncorrosive materials.

OBJECTS OF THE INVENTION

Accordingly, the objects of the invention are:
To provide an improved porous membrane support;
To provide a membrane support of controlled porosity;
To provide a noncorrosive membrane support of controlled porosity; and
To provide a membrane support plate having small pores on the face portions thereof and larger pores in the interior portion.

BRIEF DESCRIPTION OF THE DRAWINGS

FIG. 1 represents a cross-section of the working area of preferred embodiment according to the invention.
FIG. 2 is a plan view showing the membrane support.
FIG. 3 is a cross-sectional view taken along 3—3 of FIG. 2 showing the outer portion of the membrane support.
FIG. 4 is a cross-section taken along 4—4 of FIG. 2.

DESCRIPTION OF THE PREFERRED EMBODIMENTS

To solve the aforementioned problems besetting the art, I use as a membrane support a laminated material which upon fabrication has a predetermined pattern of porosity throughout its cross-section.

For example, reference is made to FIG. 1, which represents the cross-section of the working portion of a preferred membrane support. In that figure, 100 represents the composite support. It can be seen that support 100 is a composite of layers 2, 3, and 4. Outside layers 2 which, in operation will be adjacent to the membrane, are constructed from a material having small pores. The sizes of these pores will vary according to the thickness and composition of the membrane supported and the pressure to which the membranes are subjected. For cellulose acetate reverse osmosis membranes of from 0.001 to 0.010 inch thick, the pore sizes of layers 2 should be in the range of from about 0.005 inch to about 0.050 inch.

At the center of the support there is shown layer 4, which is formed with large pores. These should generally be 5–20 times as large as the pores outside layers 2. In terms of thickness, this center layer will generally form the largest portion of the support. Its function is to provide a low resistance media for fluid flow and structural rigidity to the overall composite support.

The intermediate layers 3, shown in FIG. 1 serve to bridge the gap between small pored layers 2 and large pored layer 4. These intermediate layers are not always necessary to the invention, however, they are desirable when the differences in pore sizes between the small pored layers and the large pored layer is very great. In such a case it is preferred, though not necessary, that the pore sizes of layers 3 are larger than the pore sizes of layers 2 and smaller than the pore sizes of layers 4.

All of the layers should be constructed from a noncorrosive material, such as glass fiber or a plastic. A particularly good support of reverse osmosis membranes can be made from layers of fiber glass cloth of different mesh size.

For example, a support plate having the design of FIG. 1 may be formed by using 2 plies of 40 x 39 threads per inch of fiber glass cloth having a filament diameter of 0.003 inch for each outside layer 2, 2 plies of 20 x 18 threads per inch fiber glass cloth having a filament diameter of 0.0085 inch for each intermediate layer 3, and 16 plies of 10 x 10 threads per inch fiber glass cloth having a filament diameter of 0.018 inch for center layer 4.

To construct the composite, the layers of the glass fabric are preimpregnated with from about 15–20% of a conventional epoxy resin, stacked in the proper order, and then formed in a compression press. Normally, the composite is loaded to about 200 p.s.i. in the compression press. However, where the composite thickness must be closely controlled, stops may be used to limit press travel in which case loadings may not reach 200 p.s.i. The laminate is cured at the press temperature for about 30 minutes and then cooled to about 100° F. while still under pressure for about 15 minutes. This curing cycle is not deemed critical as other press loadings and curing times will give equivalent results.

After forming, the composite is rough machined to final dimensions. FIG. 2 shows a plan view of a finished support plate. In that figure, 100 is a support plate as shown in FIG. 1. The outer edge of plate 100 is machined and coated at 10 with an impervious substance such as an aluminum filled epoxy resin. A series of holes 11, are drilled through the epoxy-coated plate to provide passage of the feed liquid through the plate so that the feed fluid can be brought in contact with adjacent plates. Also, a plurality of holes 12 are provided so that the support plate can be held in position in a cell by use of locating pins.

The structure of coated area 10 is more clearly shown in FIG. 3, which is a cross-section through 3—3. There, porous plate 100 is shown as having its outer portion coated by impervious material 10. Before being coated, plate 100 is machined from point 20 to its outer edge at 21. Also, a groove is made at 22. The impervious resin is applied to the machined portion of the plate so that the resin coated portion of the plate forms a smooth surface with the noncoated portion at 23. The thickness of coating 10 is increased to form shoulders 24, and a groove 25 is provided within the impervious resin.

Referring now to FIG. 4 which is a cross-section taken along line 4—4 of FIG. 2, it is seen that porous plate 100 is machined by counter-boring to form beveled surfaces 26 and thus creating a double counterbored hole having edge 28 as its constricted circumference before being coated with resin 10 and redrilled to form hole 11. This is done to create a fluid-tight seal around hole 11. With hole 12 such a procedure is not necessary as an adequate seal between the feed fluid and product fluid is provided by an O-ring seal (not shown) in channel 25.

In operation, membranes or filters 27, as shown in FIG. 4, are placed on both sides of the support plate and fastened at their outer peripheries to the impervious material 10. Under a driving pressure, water or other fluid material being clarified passes through the filter media, and through the small and intermediate pored portions of the support plate to the large pored center portion from which it is peripherally withdrawn.

The withdrawal may be effected by allowing a positive pressure to be built up within the porous structure 4 of the plate, forcing the fluid from the plate, or by the application of a negative pressure to the periphery of the support or it may rely upon the force of gravity to cause the water to exit the lower edge of a vertically disposed support plate.

While I have described a preferred embodiment of my invention, it will be apparent that various additions, modifications, and adaptations are possible within the skill in the art. Such modifications if made will be within the spirit and scope of the invention.

What is claimed is:

1. A reverse osmosis membrane assembly comprising, a pair of cellulose acetate reverse osmosis membranes each having a thickness of from 0.001 to 0.010 inch, each of said membranes being adjacent to the opposite external surfaces of a membrane support element, said membrane support element comprising a central large pored laminate, intermediate layers of medium pored laminate which are in turn each adjacent a small pored laminate such that a small pored laminate-medium pored laminate-large pored laminate-medium pored laminate-small pored laminate composite membrane support element is formed, said small pored laminate having pore sizes in the range of from 0.005 to 0.050 inch and said large pored laminate having pore sizes from 5–20 times said small pored laminate.

References Cited

UNITED STATES PATENTS

| 3,083,834 | 4/1963 | Pall | 210—489 X |
| 3,170,867 | 2/1965 | Loeb et al. | 210—22 |
| 3,210,229 | 10/1965 | Feine | 210—489 X |
| 3,347,391 | 10/1967 | Steensen | 210—491 |

OTHER REFERENCES

Gelman Instrument Company Product Bulletin 235, "High-Pressure In-Line Filter Holder," July 1965.

REUBEN FRIEDMAN, *Primary Examiner.*

FRANK A. SPEAR, JR., *Assistant Examiner.*

U.S. Cl. X.R.

210—486

UNITED STATES PATENT OFFICE
CERTIFICATE OF CORRECTION

Patent No. 3,450,267                                   June 17, 1969

Marvin A. Jarvis

It is certified that error appears in the above identified patent and that said Letters Patent are hereby corrected as shown below:

In the heading to the printed specification, lines 3 to 5, "assignor, by mesne assignments, to the United States of America as represented by the Secretary of the Interior" should read -- assignor, by direct and mesne assignments, of one-half to Aerojet-General Corporation, Sacramento, Calif., and one-hal to the United States of America as represented by the Secretary of the Interior --.

Signed and sealed this 5th day of May 1970.

(SEAL)
Attest:

Edward M. Fletcher, Jr.                        WILLIAM E. SCHUYLER, JR.
Attesting Officer                                  Commissioner of Patents